(No Model.)

H. LIBBY.
NUT LOCK.

No. 276,252. Patented Apr. 24, 1883.

WITNESSES:
Chas. H. Kimball
John P. Lanigan

INVENTOR:
Horace Libby
Per atty.
William Henry Clifford

UNITED STATES PATENT OFFICE.

HORACE LIBBY, OF LEWISTON, MAINE, ASSIGNOR OF ONE-HALF TO HORACE C. LITTLE, OF SAME PLACE.

NUT-LOCK.

SPECIFICATION forming part of Letters Patent No. 276,252, dated April 24, 1883.

Application filed February 16, 1883. (No model.)

*To all whom it may concern:*

Be it known that I, HORACE LIBBY, of Lewiston, in the county of Androscoggin and State of Maine, have invented certain new and useful Improvements in Nut-Locking Devices; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
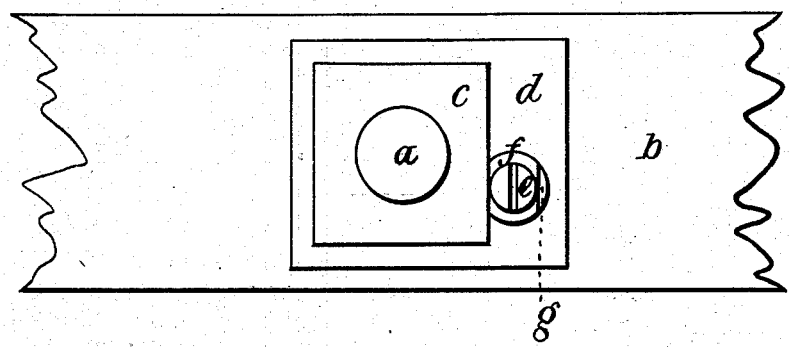
Figure 2:
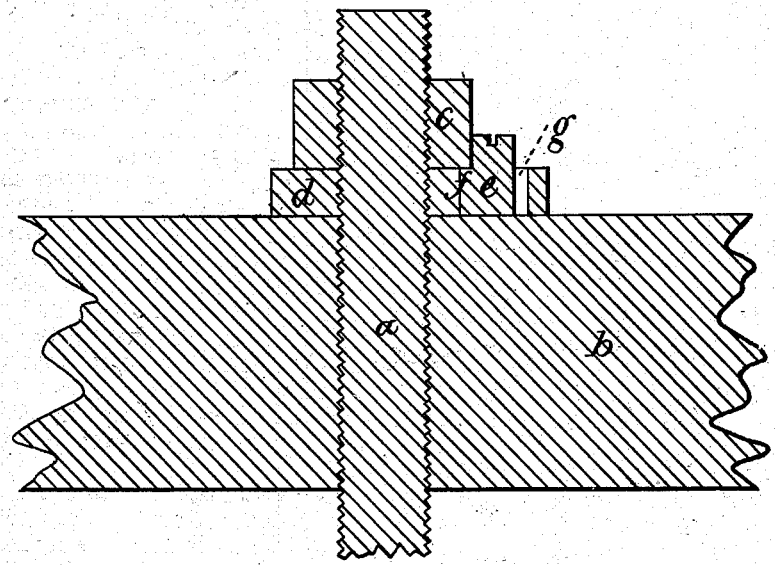

Figure 1 shows a face view. Fig. 2 shows a section.

Same letters show like parts.

My invention relates to nut-locking devices.

It consists in the combination of a bolt having a screw-thread, a nut, a washer, and a nut-stop, as hereinafter set forth.

$a$ shows a bolt; $b$, the iron or other substance through which it is passed.

$c$ shows the nut, which is screwed onto the bolt.

$d$ is a washer under the nut $c$.

$e$ is a stop or stud entering a hole in the washer $d$. The stop or stud $e$ is provided with a flange, $f$, which is level or flush with the top or outer surface of the washer $d$. This flange $f$ does not extend entirely around the stud, but is cut off at a part of the circumference, as seen at $g$. The stud is provided with the slot $h$, for the reception of the screw-driver.

The operation is manifest. The nut being screwed to its place, the stop or stud $e$ is then inserted into its place in the washer $d$, with the cut-off portion $g$ next to the nut. When the stud or stop is in place it is turned by a screw-driver, so as to turn a portion of the flange $f$ under the nut. Thus the stud is kept from dropping or working out. The stud or stop $e$ is of course so placed against the side of the nut as to prevent its turning in that direction in which it would turn if working off or unscrewing from its bolt. The washer may in certain cases be dispensed with and the stop inserted directly into the wood or metal through which the bolt or screw passes—as, for example, the part represented by $b$.

It is plain that a nut on a bolt in positions in machinery or other structures where it is subject to jar, oscillation, and consequent working off, can be securely held, and serves at the same time to hold the stop by which it is itself held.

I do not claim stopping or holding a nut by a stud or stop. My invention is limited to the combination herein set out. The stop or stud $e$ has a round socket for its reception in the wood or other material into which the bolt $a$ enters.

What I claim as my invention, and desire to secure by Letters Patent of the United States, is—

In combination with the bolt $a$ and nut $c$, the round stop or stud $e$, provided with a flange, $f$, extending only a part of the way around the stud, and a round socket for the reception of the stud, either with or without the washer $d$, as herein set forth.

In testimony that I claim the foregoing as my own I affix my signature in presence of two witnesses.

HORACE LIBBY.

Witnesses:
ALBERT R. SAVAGE,
GEORGE M. COOMBS.